United States Patent
El Ayach et al.

(10) Patent No.: US 9,496,975 B2
(45) Date of Patent: Nov. 15, 2016

(54) DYNAMIC DIRECTIONAL SYNCHRONIZATION SIGNALS IN WIRELESS COMMUNICATIONS

(71) Applicant: QUALCOMM Incorporated, San Diego, CA (US)

(72) Inventors: Omar El Ayach, San Diego, CA (US); Sundar Subramanian, Bridgewater, NJ (US); Ashwin Sampath, Skillman, NJ (US); Junyi Li, Chester, NJ (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/624,742

(22) Filed: Feb. 18, 2015

(65) Prior Publication Data
US 2016/0087743 A1    Mar. 24, 2016

Related U.S. Application Data

(60) Provisional application No. 62/052,927, filed on Sep. 19, 2014.

(51) Int. Cl.
| | |
|---|---|
| *H04W 72/00* | (2009.01) |
| *H04J 11/00* | (2006.01) |
| *H04W 52/16* | (2009.01) |
| *H04W 56/00* | (2009.01) |

(Continued)

(52) U.S. Cl.
CPC ......... *H04J 11/0066* (2013.01); *H04L 5/0007* (2013.01); *H04W 52/16* (2013.01); *H04W 52/242* (2013.01); *H04W 56/00* (2013.01); *H04W 56/001* (2013.01); *H04J 2011/0096* (2013.01)

(58) Field of Classification Search
None
See application file for complete search history.

(56) References Cited

U.S. PATENT DOCUMENTS

| | | | |
|---|---|---|---|
| 5,022,046 A | 6/1991 | Morrow | |
| 6,084,919 A * | 7/2000 | Kleider | H04B 1/707 375/285 |

(Continued)

FOREIGN PATENT DOCUMENTS

| | | |
|---|---|---|
| WO | WO2010025244 A2 | 3/2010 |
| WO | WO-2010078969 A1 | 7/2010 |
| WO | WO-2011105938 A1 | 9/2011 |

OTHER PUBLICATIONS

Barati et al., "Directional Cell Search for Millimeter Wave Cellular Systems," 2014 IEEE 15th International Workshop on Signal Processing Advances in Wireless Communications (SPAWC), Toronto, ON, Jun. 22-25, 2014, 5 pgs., ISBN 978-1-4799-4903-8, Institute of Electrical and Electronics Engineers.

(Continued)

*Primary Examiner* — Adolf Dsouza
(74) *Attorney, Agent, or Firm* — Holland & Hart LLP

(57) ABSTRACT

Methods, systems, and devices are described for dynamic directional synchronization signal signals in a millimeter wave communication system. A base station may determine a narrowband signal component and a wideband signal component of a synchronization signal for millimeter wave communications. The base station may identify network characteristic(s) of the millimeter wave communication network and adjust parameter(s) of the narrowband signal and/or the wideband signal components of the synchronization signal. The parameters may include a transmission power split or ratio, a bandwidth, a tone selection, or any combination of these parameters.

30 Claims, 12 Drawing Sheets

(51) Int. Cl.
*H04L 5/00* (2006.01)
*H04W 52/24* (2009.01)

(56) References Cited

U.S. PATENT DOCUMENTS

| | | |
|---|---|---|
| 6,489,923 B1 | 12/2002 | Bevan et al. |
| 2004/0224719 A1 | 11/2004 | Nounin et al. |
| 2008/0039098 A1* | 2/2008 | Papasakellariou H04W 72/1231 455/442 |
| 2009/0232126 A1* | 9/2009 | Cordeiro ............ H01Q 3/26 370/350 |
| 2009/0262710 A1 | 10/2009 | Doi et al. |
| 2013/0235851 A1 | 9/2013 | Abu-Surra et al. |

OTHER PUBLICATIONS

ISA/EPO, Partial International Search Report of the International Searching Authority, Int'l. App. No. PCT/US2015/046561, Nov. 16, 2015, European Patent Office, Rijswijk, NL, 7 pgs.

Tomatis et al., "7. Synchronization and Cell Search," LTE—The UMTS Long Term Evolution: From Theory to Practice, Second Edition (eds. Sesia et al.), 2011, pp. 141-157, doi: 10.1002/9780470978504.ch7, John Wiley & Sons, Ltd, Chichester, UK.

ISA/EPO, International Search Report and Written Opinion of the International Searching Authority, Int'l. App. No. PCT/US2015/046561, Jan. 22, 2016, European Patent Office, Rijswijk, NL, 18 pgs.

* cited by examiner

DYNAMIC DIRECTIONAL SYNCHRONIZATION SIGNALS IN WIRELESS COMMUNICATIONS

CROSS REFERENCES

The present application for patent claims priority to U.S. Provisional Patent Application No. 62/052,927 by El Ayach et al., entitled "Dynamic Directional Synchronization Signals in Wireless Communications," filed Sep. 19, 2014, and assigned to the assignee hereof.

BACKGROUND

Field of the Disclosure

The present disclosure relates to wireless communication systems, and more particularly to dynamic directional synchronization signals in wireless communications.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station). UEs may locate a base station by detecting synchronization signal(s), from which the UEs acquire the base station identification code (cell ID), system timing information, frame alignment information, etc. In systems where the receiver is highly signal strength and noise limited (e.g., millimeter wave systems), beamformed synchronization signals may be swept across the cell coverage area to provide coverage enhancement to improve detection.

A wireless communication system that employs a dual-signal synchronization scheme may include a high power narrowband signal and a low power wideband signal. However, aspects may make detection of the narrowband signal more or less reliable than detection of the wideband signal. For example, the higher power narrowband signal may propagate farther than the lower power wideband signal. Other factors that may affect detection may include the geographic coverage area of the millimeter wave cell, the density of UEs and/or base stations within the cell, UE configurations, interference, etc. Therefore, a fixed narrowband/wideband signal configuration may not be ideal in every situation.

SUMMARY

The described features generally relate to one or more improved systems, methods, and/or apparatuses for dynamic directional synchronization signals in wireless communications. In some examples, a base station may determine a narrowband signal component and a wideband signal component of the synchronization signal for millimeter wave communications where one or more parameters of the narrowband and/or wideband signal may be adjusted. Characteristics associated with the millimeter wave communication network may also be determined, e.g., level of timing synchronization between UEs, UEs detecting incorrect synchronization signals, etc. Based on the network characteristics, parameter(s) of the narrowband signal and/or the wideband signal may be dynamically adjusted. For example, the power split between the narrowband signal and the wideband signal may be adjusted (e.g., one transmission power increased while the other transmission power decreased). In another example, the bandwidth of the wideband signal may be adjusted (e.g., increased or decreased) based on the characteristics. Accordingly, the synchronization signal components may be dynamically adjusted to account for network characteristics and improve detection.

A method of wireless communication at a wireless device is described. The method may include determining a narrowband signal component and a wideband signal component of a synchronization signal of a millimeter wave communication network, identifying one or more characteristics associated with the millimeter wave communication network, and selectively adjusting a parameter of at least one of the narrowband signal component and the wideband signal component based at least in part on the identified characteristics.

An apparatus for wireless communication at a wireless device is described. The apparatus may include means for determining a narrowband signal component and a wideband signal component of a synchronization signal of a millimeter wave communication network, means for identifying one or more characteristics associated with the millimeter wave communication network, and means for selectively adjusting a parameter of at least one of the narrowband signal component and the wideband signal component based at least in part on the identified characteristics.

A further apparatus for wireless communication at a wireless device is described. The apparatus may include a processor, memory in electronic communication with the processor, and instructions stored in the memory, wherein the instructions are executable by the processor to determine a narrowband signal component and a wideband signal component of a synchronization signal of a millimeter wave communication network, identify one or more characteristics associated with the millimeter wave communication network, and selectively adjust a parameter of at least one of the narrowband signal component and the wideband signal component based at least in part on the identified characteristics.

A non-transitory computer-readable medium storing computer executable code for wireless communication at a wireless device is described. The code may be executable by a processor to determine a narrowband signal component and a wideband signal component of a synchronization signal of a millimeter wave communication network, identify one or more characteristics associated with the millimeter wave communication network, and selectively adjust a parameter of at least one of the narrowband signal component and the wideband signal component based at least in part on the identified characteristics.

In some examples of the method, apparatuses, or non-transitory computer-readable medium described above, adjusting the at least one parameter includes adjusting a transmission power split between the narrowband signal component and the wideband signal component. Additionally or alternatively, in some examples the transmission power split comprises a ratio of a first transmission power of the narrowband signal component and a second transmission power of the wideband signal component.

Some examples of the method, apparatuses, or non-transitory computer-readable medium described above may further include identifying a reduction in a detection of the narrowband signal component by one or more user equipment (UEs) located at an edge of a coverage area of a source transmitting the narrowband signal component and the wideband signal component, increasing a first transmission power of the narrowband signal component based at least in part on the identified reduction, and decreasing a second transmission power of the wideband signal component based at least in part on the identified reduction. Additionally or alternatively, some examples may include receiving information indicative of a predefined level of timing synchronization between one or more user equipment (UEs) located within a coverage area of a source transmitting the narrowband signal component and the wideband signal component, and selectively adjusting the parameter of at least one of the narrowband signal component and the wideband signal component based at least in part on the level of timing synchronization.

In some examples of the method, apparatuses, or non-transitory computer-readable medium described above, the one or more characteristics includes one or more of a level of timing synchronization between one or more user equipment (UEs) located within a coverage area of a source transmitting the narrowband signal component and the wideband signal component, a false alarm rate associated with the one or more UEs detecting an incorrect synchronization signal, a distribution of UEs entering the coverage area of the source, or a combination thereof. Additionally or alternatively, in some examples adjusting the at least one parameter includes adjusting a bandwidth of the wideband signal component.

Some examples of the method, apparatuses, or non-transitory computer-readable medium described above may further include increasing the bandwidth of the wideband signal component based at least in part on a determination of a pathloss above a predefined threshold or a level of frequency selectivity exceeding a predefined value. Additionally or alternatively, some examples may include increasing the bandwidth of the wideband signal component based at least in part on a determination that the wideband signal component is being used for channel estimation by at least one user equipment.

Some examples of the method, apparatuses, or non-transitory computer-readable medium described above, adjusting the at least one parameter includes at least one of transmitting the wideband signal component on consecutive tones, transmitting the wideband signal component on alternating tones, transmitting the wideband signal component on non-uniform tones, or a combination thereof. Additionally or alternatively, in some examples identifying the one or more characteristics includes one or more of receiving a feedback signal from one or more user equipment (UEs) communicating via the millimeter wave wireless communication system, receiving a feedback signal from one or more other sources of the millimeter wave wireless communication system, receiving a feedback signal from one or more base stations of a non-millimeter wave wireless communication system, or a combination thereof.

In some examples of the method, apparatuses, or non-transitory computer-readable medium described above, the narrowband signal component includes a beacon signal and the wideband signal component comprises a wideband signal. Additionally or alternatively, in some examples the wideband signal comprises a Zadoff-Chu sequence.

In some examples of the method, apparatuses, or non-transitory computer-readable medium described above, the narrowband signal component and the wideband signal component of the synchronization signal are directionally transmitted via one or more beamformed signals.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
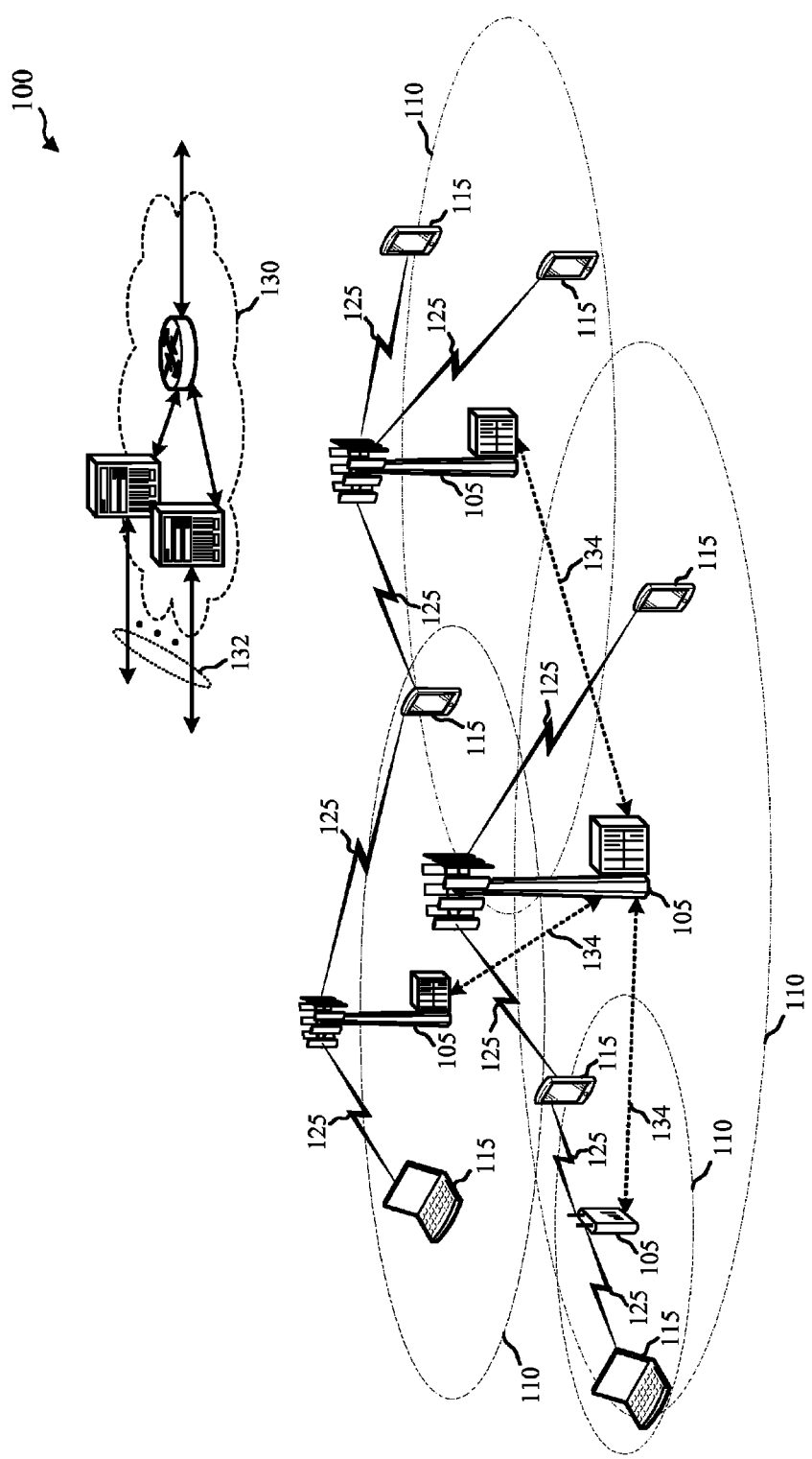
FIG. 1 shows a block diagram of a wireless communication system, in accordance with various aspects of the present disclosure.

In high frequency systems (e.g., millimeter wave communication systems), a base station may employ a dual-component synchronization signal scheme where two signals are transmitted. A narrowband signal and a wideband signal may be sent, the narrowband signal generally having a higher transmit power spectral density than the wideband signal. The combination of the narrowband signal and the wideband signal components of the synchronization signal generally convey timing information, cell ID, and/or various other parameters associated with the wireless communication system. The two components of the synchronization signal, however, may not be detected equally by UEs for various reasons. For example, the higher power narrowband signal may travel farther than the lower power wideband signal and, therefore, UEs at the edge of a cell coverage area may have difficulty detecting the wideband signal. Topography and/or environment within the cell coverage area may impact detection of one component more than the other. Currently there is no mechanism for a base station (or source cell) of the synchronization signal to dynamically adjust the parameters of the narrowband signal and/or the wideband signal based on the network characteristics to provide reliable detection of both synchronization signal components.

According to aspects of the present description, the parameters of the narrowband signal and/or the wideband signal components of the synchronization signal for millimeter wave communications may be dynamically adjusted based on various characteristics of the millimeter wave communication network. A base station (or source cell) may determine the narrowband signal and the wideband signal for the synchronization signal. The base station may identify characteristics associated with the millimeter wave communications network. For example, the base station may receive feedback signals from other UEs within its coverage area indicative of channel conditions and/or interference, receive feedback signals from other base stations (both millimeter wave and non-millimeter wave base stations), or combinations thereof. In some examples, the base station may determine one or more characteristics based on internal factors. Based on the characteristics, the base station may adjust one, some, or all of the parameters of the narrowband signal and/or the wideband signal to improve detection of both components of the synchronization signal. The base station may adjust the parameters once, periodically based on a schedule, and/or in real-time (or dynamically) as the network characteristics vary. In some examples, the base station may adjust the parameters to achieve goals other than pure detection of both signal components, e.g., to improve channel estimation by a UE using the wideband signal more than the narrowband signal, or vice versa.

According to additional aspects of the present disclosure, the base station may vary a power split between the narrowband signal and the wideband signal. For example, for a fixed or predetermined transmission power for both signals, the base station may raise the transmission power of the narrowband signal and lower the transmission power of the wideband signal, or vice versa. In other examples, the base station may adjust the bandwidth of the wideband signal component. For examples, the base station may make the wideband signal have a wider bandwidth or a more narrow bandwidth. Further, the base station may adjust the wideband signal to transmit on contiguous tones, or alternating (every other) tone, or some other predefined scheme.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies, e.g., LTE/LTE-A, millimeter wave, etc.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context. In some examples, the wireless communications system 100 may be, or include a millimeter wave communication network having one or more base stations 105 in communication with UEs 115.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs, small cell eNBs, relay base stations, and the like. A UE 115 may also be able to communicate with other UEs either within or outside the same coverage area of a base station via D2D communications.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support dynamic directional synchronization signal for millimeter wave detection and synchronization. For example, a millimeter wave base station 105 may determine a narrowband signal component and a wideband signal component of a synchronization signal and directionally transmit (e.g., beamformed) the synchronization signal in a sweeping pattern to UEs 115 within its coverage area 110. The base station 105 may configure a narrowband signal of the synchronization signal to convey location and other parameters information for a wideband signal of the synchronization signal. The base station 105 may link the wideband signal to the location of the narrowband signal. The base station 105 may identify one or more characteristics of the millimeter wave network, e.g., pathloss, interference, timing synchronization, etc. Based on the identified characteristics, the base station 105 may adjust a parameter of the narrowband signal component and/or the wideband signal component. As one examples, the base station may receive feedback from other base stations indicating that there is a high degree of timing synchronization among UEs within the coverage area and, based on this information, increase the transmission power of the narrowband signal and reduce (or even eliminate) the transmission power of the wideband signal component.

Figure 2:
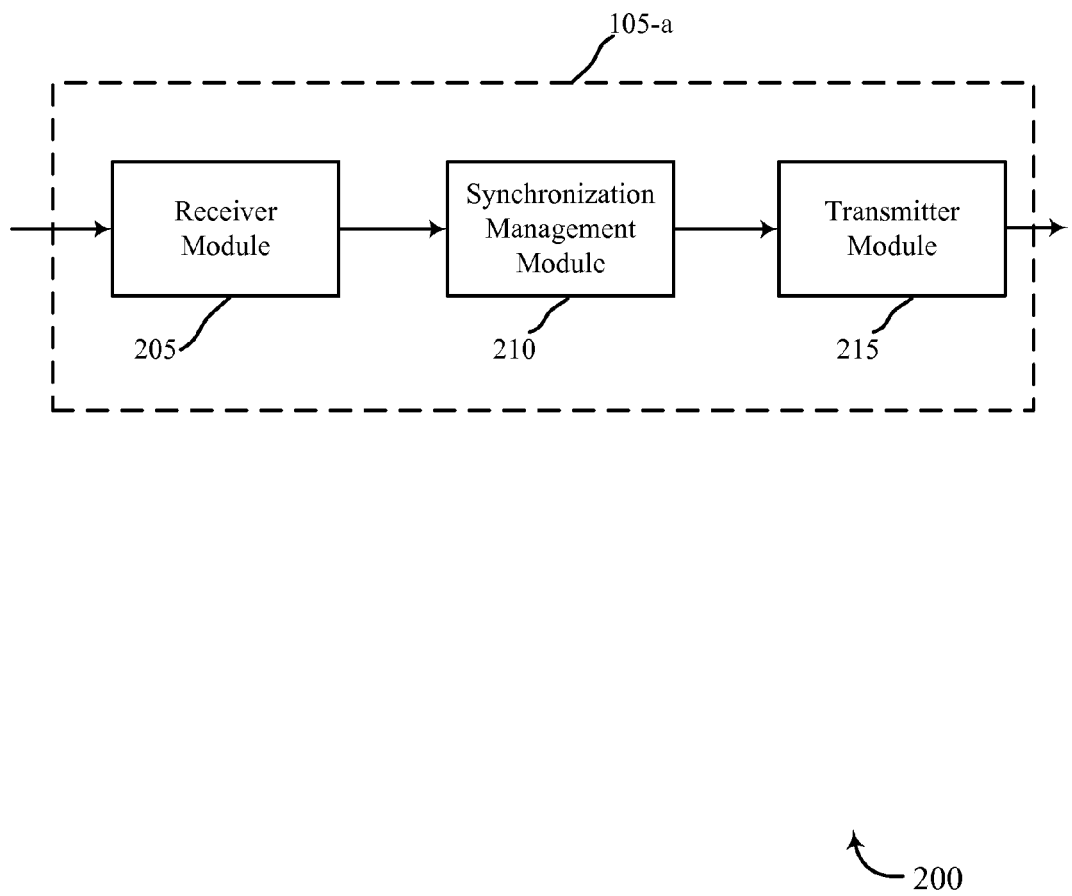
FIG. 2 shows a block diagram of a device configured for use in wireless communication, in accordance with various aspects of the present disclosure.

FIG. 2 shows a block diagram 200 of a device 105-a for use in wireless communication, in accordance with various aspects of the present disclosure. The device 105-a may be an example of one or more aspects of a base stations 105 described with reference to FIG. 1. The device 105-a may include a receiver module 205, a synchronization management module 210, and/or a transmitter module 215. The device 105-a may also be or include a processor (not shown). Each of these modules may be in communication with each other.

The components of the device 105-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 205 may receive information such as packets, user data, and/or control information associated with various information channels (e.g., control channels, data channels, etc.). The receiver module 205 may receive messages from a millimeter wave UE 115 including information associated with synchronization signaling, access procedures, etc. Information may be passed on to the synchronization management module 210, and to other components of the device 105-a.

The synchronization management module 210 may manage synchronization functions for the device 105-a. The synchronization management module 210 may determine the narrowband signal and the wideband signal for synchronization signal in millimeter wave communications. The synchronization management module 210 may identify characteristics associated with the millimeter wave communication network, via the receiver module 205 and/or the transmitter module 215, for example. The synchronization management module 210 may, based on the characteristics, adjust a parameter of the narrowband signal, the wideband signal, or combinations thereof. For example, the synchronization management module 210 may change transmission power level(s), adjust a bandwidth, etc., for the narrowband signal and the wideband signal components of the synchronization signal.

The transmitter module 215 may transmit the one or more signals received from other components of the device 115-a. The transmitter module 215 may transmit information such as packets, user data, and/or control information to a serving cell. The transmitter module 215 may send one or more signals a millimeter wave UE 115 in conjunction with various synchronization signaling operations, random access procedures, etc. In some examples, the transmitter module 215 may be collocated with the receiver module 205 in a transceiver module.

Figure 3:
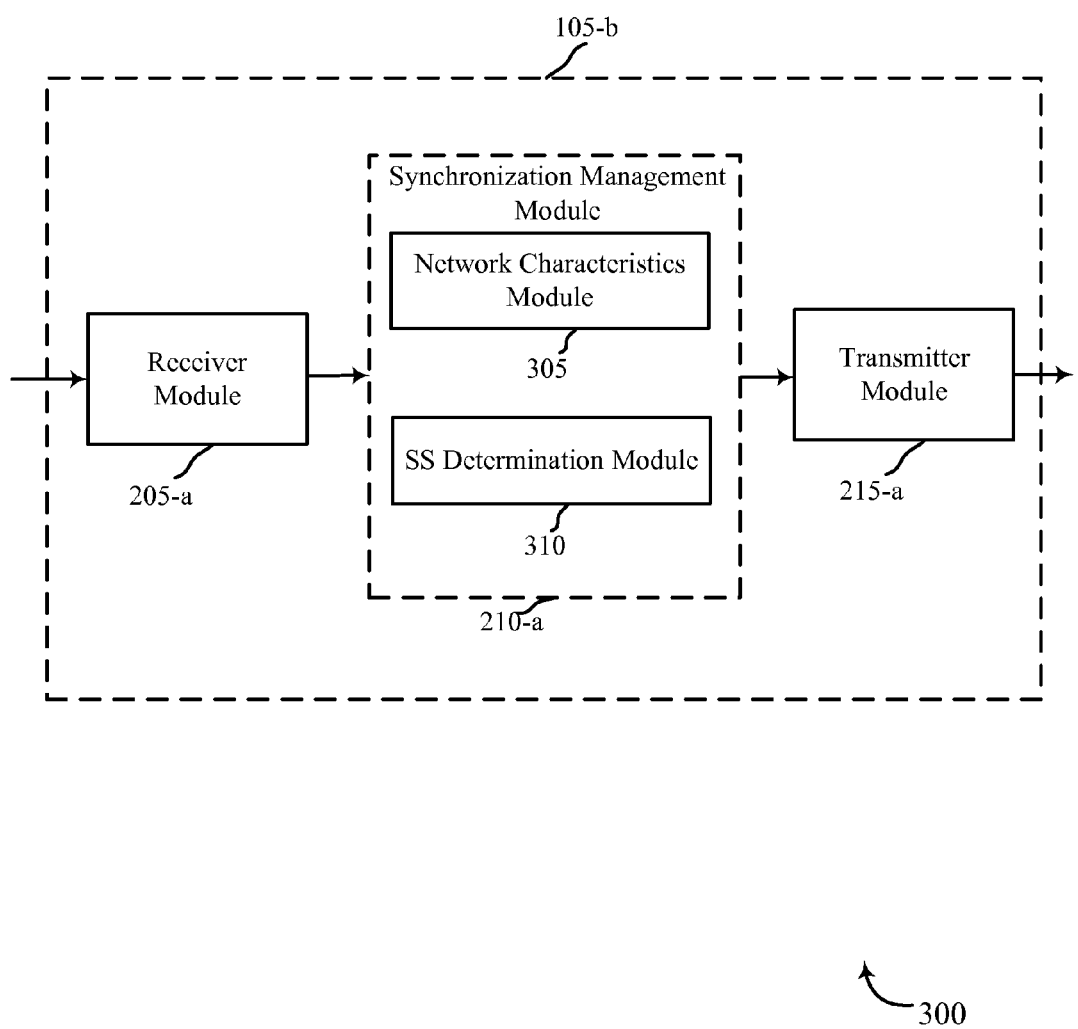
FIG. 3 shows a block diagram of a device configured for use in wireless communication, in accordance with various aspects of the present disclosure.

FIG. 3 shows a block diagram 300 of a device 105-b for use in wireless communication, in accordance with various examples. The device 105-b may be an example of one or more aspects of a base stations 105 described with reference to FIG. 1. It may also be an example of a device 105-a described with reference to FIG. 2. The device 105-b may include a receiver module 205-a, a synchronization management module 210-a, and/or a transmitter module 215-a, which may be examples of the corresponding modules of device 105-a. The device 105-b may also include a processor (not shown). Each of these components may be in communication with each other. The synchronization management module 210-a may include a network characteristics module 305 and a synchronization signal determination module 310. The receiver module 205-a and the transmitter module 215-a may perform the functions of the receiver module 205 and the transmitter module 215, of FIG. 2, respectively.

The components of the device 105-b may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The network characteristics module 305 may manage aspects of network characteristics determination and management for the device 105-b. The network characteristics module 305 may, in cooperation with the receiver module 205-a and/or the transmitter module 215-a, receive feedback signals from UE within the coverage area of the device 105-b, from millimeter and non-millimeter wave base stations 105, and/or determine various network characteristics based on internal data. Example network characteristics may include pathloss values, interference values and/or sources, timing synchronization levels, coverage area size, density of UEs 115 and/or base stations 105 with the coverage area, or combinations thereof. The network characteristics may generally identify propagation characteristics, for example, within the coverage area of the device 105-b. The network characteristics may also indicate the level of synchronization required by UEs 115 within the coverage area.

The synchronization signal determination module 310 may manage aspects of synchronization signaling for the device 105-b. For example, the synchronization signal determination module 310 may, in cooperation with the network characteristics module 305 and/or the transmitter module 215-a, may determine the narrowband signal and the wideband signal components for the synchronization signal for millimeter wave communications. The synchronization signal determination module 310 may communicate with the network characteristics module 305 to determine whether, and which parameters of the narrowband signal and/or the wideband signal are to be adjusted to overcome or adapt to the current characteristics of the millimeter wave network. Based on the network characteristics identified by the network characteristics module 305, the synchronization signal determination module 310 may adjust the appropriate parameter(s) (e.g., power, bandwidth, frequency selection/hopping pattern, etc.) of the narrowband signal and/or the wideband signal. The synchronization signal determination module 310 may, in cooperation with the transmitter module 215-a, transmit the narrowband signal and the wideband signal of the synchronization signal to UEs within its coverage area.

Figure 4:
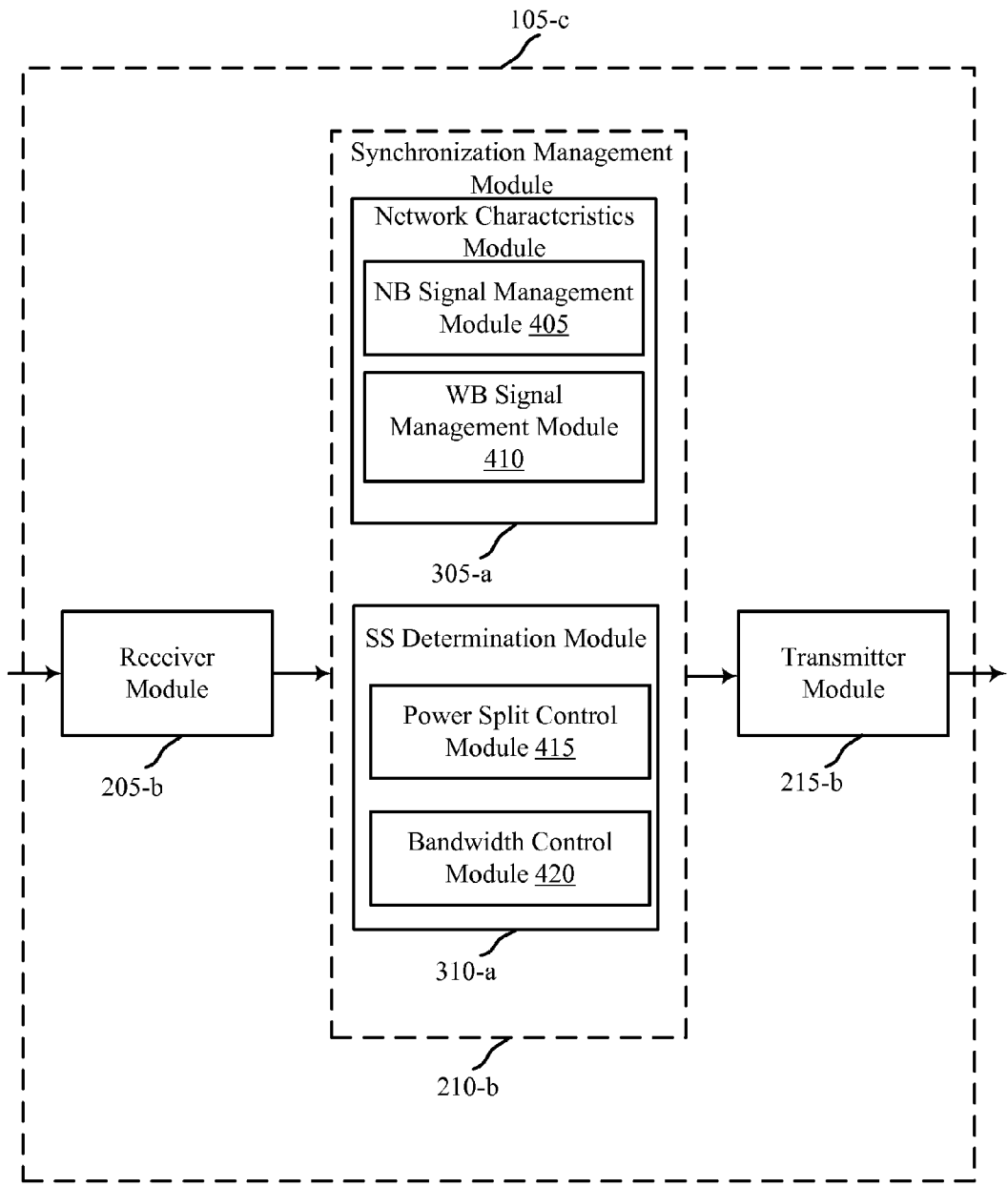
FIG. 4 shows a block diagram of a device configured for use in wireless communication, in accordance with various aspects of the present disclosure.

FIG. 4 shows a block diagram 400 of a device 105-c for use in wireless communication, in accordance with various examples. The device 105-c may be an example of one or more aspects of a base station 105 described with reference to FIG. 1. It may also be an example of a device 105-a and/or 105-b described with reference to FIGS. 2 and 3. The device 105-c may include a receiver module 205-b, a synchronization management module 210-b, and/or a transmitter module 215-b, which may be examples of the corresponding modules of devices 105-a and/or 105-b. The device 105-c may also include a processor (not shown). Each of these components may be in communication with each other. The synchronization management module 210-b may include a network characteristics module 305-a, and a synchronization signal determination module 310-a. The receiver module 205-b and the transmitter module 215-b may perform the functions of the receiver module 205 and the transmitter module 215, of FIG. 2, respectively.

The components of the device 105-c may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The network characteristics module 305-a may include a narrowband signal management module 405 and a wideband signal management module 410 and may manage aspects of synchronization signal identification and management for the device 105-c. The narrowband signal management module 405 may, via the receiver module 205-b, receive a feedback signal from one or more components of the millimeter wave communication network and/or components of a different communication network. Based on the feedback signals, the narrowband signal management module 405 may determine a network characteristic for the narrowband signal component of the synchronization signal. For example, the narrowband signal management module 405 may identify channel characteristics, timing synchronization levels, false detection rates, etc., for the narrowband signal component of the synchronization signal. In some examples, the narrowband signal management module 405 may determine that the narrowband signal is being received by the other components, is needed for various synchronization functions, etc. The narrowband signal management module 405 may output information, to the synchronization signal determination module 310-a for example, indicative of the network characteristics with respect to the narrowband signal component of the synchronization signal.

The wideband signal management module 410 may, via the receiver module 205-b, receive a feedback signal from one or more components of the millimeter wave communication network and/or components of a different communication network. Based on the feedback signals, the wideband signal management module 410 may determine a network characteristic for the wideband signal component of the synchronization signal. For example, the wideband signal management module 410 may identify channel characteristics, timing synchronization levels, false detection rates, etc., for the wideband signal component of the synchronization signal. In some examples, the wideband signal management module 410 may determine that the wideband signal is being received by the other components, is needed for various synchronization functions, etc. The wideband signal management module 410 may output information, to the synchronization signal determination module 310-a for example, indicative of the network characteristics with respect to the wideband signal component of the synchronization signal.

The synchronization signal determination module 310-a may include a power split control module 415 and a bandwidth control module 420 and may manage aspects of synchronization signal determination and adjustment operations for the device 105-c. The power split control module 415 may, in cooperation with the network characteristics module 305-a, determine the transmission power for the narrowband signal and the wideband signal. For example, the device 105-b may determine the narrowband and wideband signal parameters (e.g., transmission power, frequency, bandwidth, etc.) and, based on the network characteristics, adjust one or more of those parameters. The power split control module 415 may adjust the transmission power of the narrowband signal and the transmission power of the wideband signal. In some examples, the device 105-b may allocate a fixed or maximum transmission power limit for the synchronization signal transmissions. In such an example, the power split control module 415 may adjust the transmission power levels for the narrowband and wideband signals by dividing up the available transmission power. That is, the ratio of transmission power for the narrowband signal and the wideband signal may be adjusted based on the identified network characteristics.

The bandwidth control module 420 may, in cooperation with the network characteristics module 305-a, manage aspects of bandwidth allocation for the synchronization signal transmission. For example, the bandwidth control module may adjust the bandwidth of the narrowband signal, the wideband signal, or both signals, based on the identified network characteristics. In some network environments, the bandwidth control module 420 may increase or reduce the bandwidth of the wideband signal. The bandwidth control module 420 may also determine which location (e.g., frequency, time, etc.) for the transmission of the synchronization signal components. For example, the bandwidth control module 420 may assign contiguous frequencies or tones to the wideband signal, alternating frequencies or tones to the wideband signal (e.g., every other available tone), or may assign a non-uniform frequency allocation for the wideband signal. In some examples, the bandwidth control module 420 may determine a hopping pattern for the wideband signal.

Figure 5:
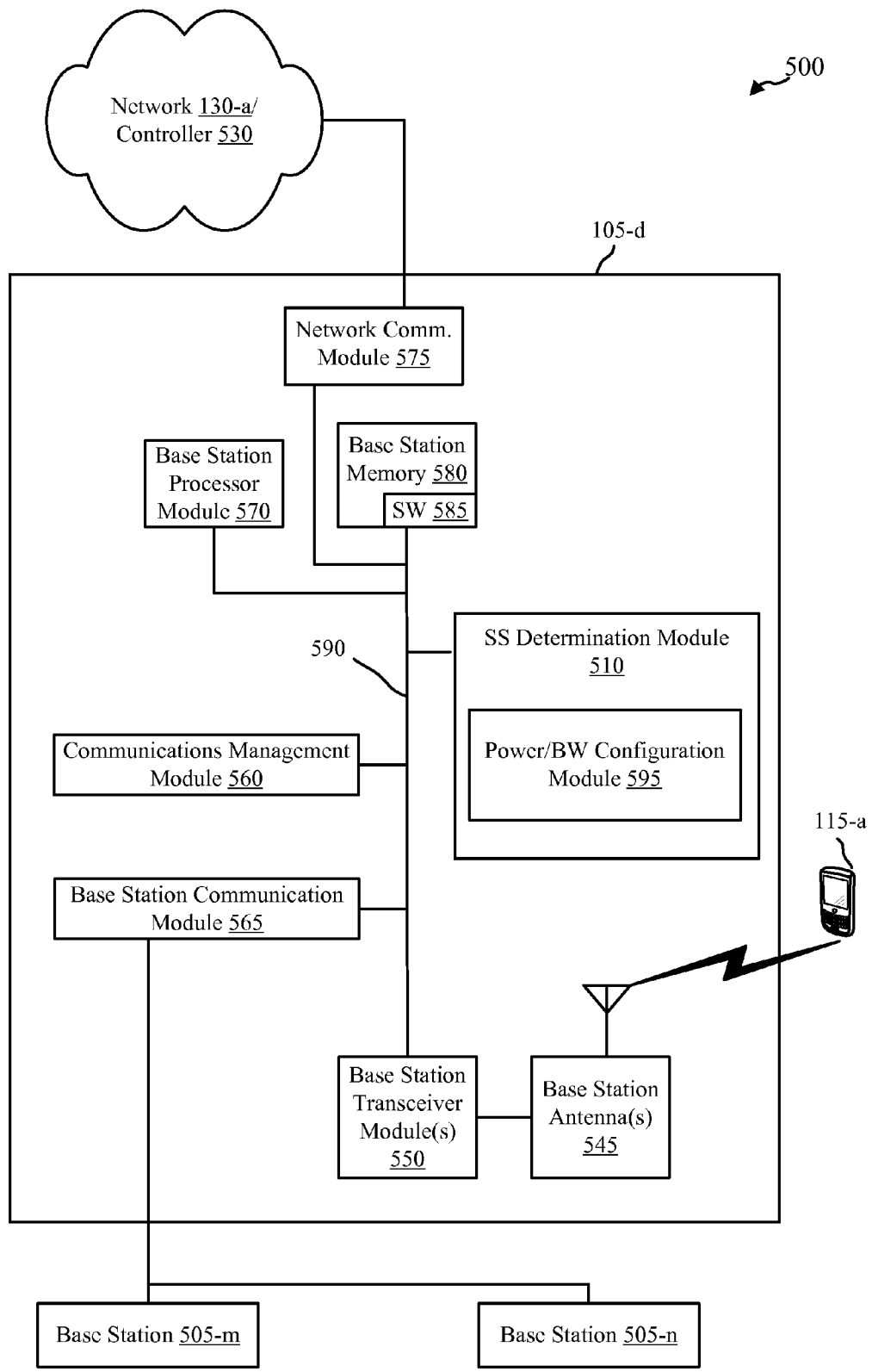
FIG. 5 shows a block diagram of a wireless communication system, in accordance with various aspects of the present disclosure.

FIG. 5 shows a block diagram 500 of a base station 105-d (e.g., a base station forming part or all of an eNB) for use in wireless communication, in accordance with various aspects of the present disclosure. In some examples, the base station 105-d may be an example of aspects of one or more of the base stations 105 described with reference to FIG. 1, 2, 3, or 4, and/or aspects of one or more of the devices 105 described with reference to FIG. 2, 3, or 4, when configured as a base station. The base station 105-d may implement or facilitate at least some of the base station and/or device features and functions described with reference to FIG. 1, 2, 3, or 4.

The base station 105-d may include a base station processor module 570, a base station memory module 580, at least one base station transceiver module (represented by base station transceiver module(s) 550), at least one base station antenna (represented by base station antenna(s) 545), and/or a synchronization signal determination module 510. The base station 105-d may also include one or more of a base station communications module 565 and/or a network communications module 575. Each of these modules may be in communication with each other, directly or indirectly, over one or more buses 590.

The base station memory module 580 may include random access memory (RAM) and/or read-only memory (ROM). The base station memory module 580 may store computer-readable, computer-executable software/firmware code 585 containing instructions that, when executed, cause the base station processor module 570 to perform various functions described herein related to wireless communication (e.g., determine wideband signal and narrowband signal components of a synchronization signal, adjust parameter(s) of the signal components based on network characteristics, etc.). Alternatively, the computer-readable, computer-executable software/firmware code 585 may not be directly executable by the base station processor module 570 but cause the base station 105-*d* (e.g., when compiled and executed) to perform various of the functions described herein.

The base station processor module 570 may include an intelligent hardware device, e.g., a central processing unit (CPU), a microcontroller, an ASIC, etc. The base station processor module 570 may process information received through the base station transceiver module(s) 550, the base station communications module 565, and/or the network communications module 575. The base station processor module 570 may also process information to be sent to the transceiver module(s) 550 for transmission through the antenna(s) 545, to the base station communications module 565, for transmission to one or more other base stations 505-*m* and 505-*n*, and/or to the network communications module 575 for transmission to a core network 530, which may be an example of one or more aspects of the core network 130 described with reference to FIG. 1. The base station processor module 570 may handle, alone or in connection with the synchronization signal determination module 510, various aspects of synchronization signaling operations for UEs for millimeter wave communications.

The base station transceiver module(s) 550 may include a modem to modulate packets and provide the modulated packets to the base station antenna(s) 545 for transmission, and to demodulate packets received from the base station antenna(s) 545. The base station transceiver module(s) 550 may, in some examples, be implemented as one or more base station transmitter modules and one or more separate base station receiver modules. The base station transceiver module(s) 550 may support communications in a first radio frequency spectrum band and/or a second radio frequency spectrum band. The base station transceiver module(s) 550 may communicate bi-directionally, via the antenna(s) 545, with one or more UEs or apparatuses, such as one or more of the UEs 115 described with reference to FIG. 1, 2, 3, or 4. The base station 105-*d* may, for example, include multiple base station antennas 545 (e.g., an antenna array). The base station 105-*d* may communicate with the core network 130-*a* through the network communications module 575. The base station 105-*d* may also communicate with other base stations, such as the base stations 505-*m* and 505-*n*, using the base station communications module 565.

The synchronization signal determination module 510 may perform and/or control some or all of the features and/or functions described with reference to FIG. 2, 3, or 4 related to dynamic synchronization signaling operations, e.g., narrowband signal determination and adjustment, wideband signal determination and adjust, etc. The synchronization signal determination module 510 may include a power/bandwidth configuration module 595 that performs some or all of the features and/or functions of the synchronization signal determination module 510. In some examples, the power/bandwidth configuration module 595 may determine a transmission power and/or a bandwidth for the narrowband signal component and the wideband signal component of the synchronization signal. The power/bandwidth configuration module 595 may adjust the parameters for the signal components based on identified network characteristics for the millimeter wave communication network. The synchronization signal determination module 510, or portions of the module 510, may include a processor, and/or some or all of the functions of the synchronization signal determination module 510 may be performed by the base station processor module 570 and/or in connection with the base station processor module 570. In some examples, the synchronization signal determination module 510 may be an example of the synchronization management module 210, 210-*a*, and/or 210-*b*, described with reference to FIGS. 2, 3, and/or 4.

Figure 6:
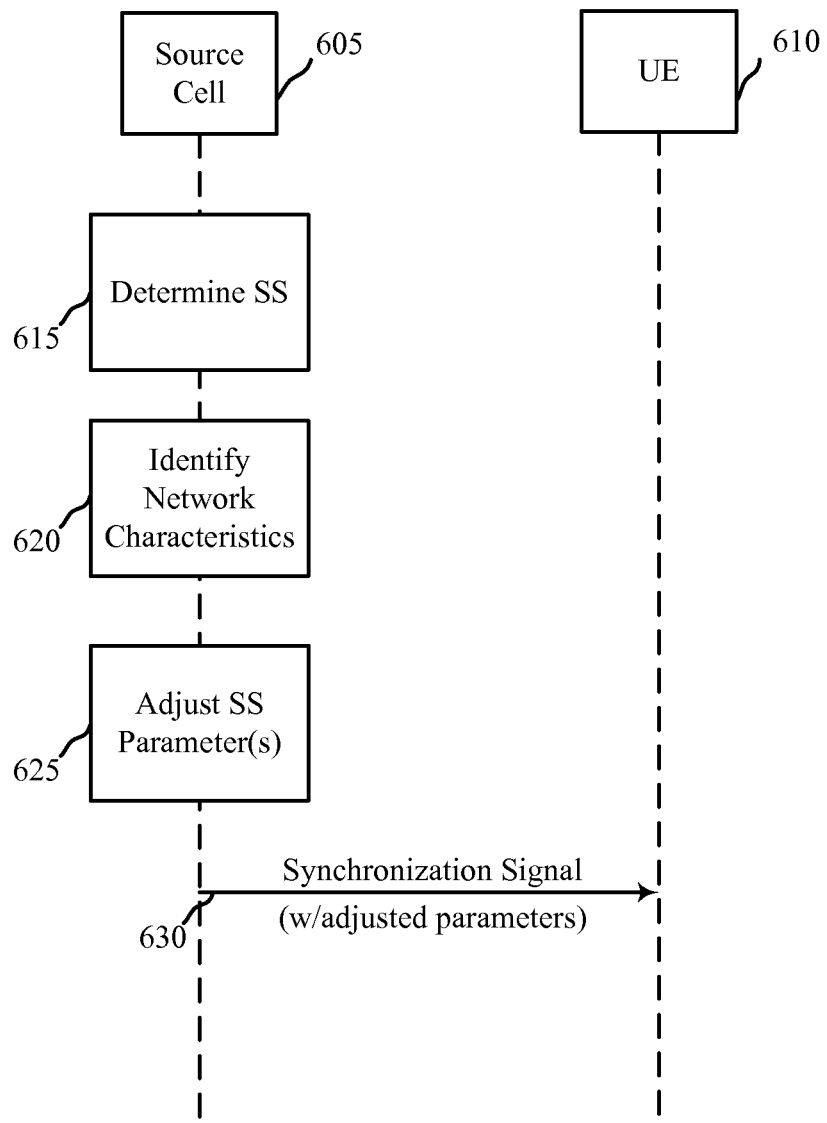
FIG. 6 shows a swim diagram illustrating aspects of dynamic directional synchronization signals in wireless communication, in accordance with various aspects of the present disclosure.

FIG. 6 is a swim diagram 600 illustrating aspects of synchronization operations, in accordance with various aspects of the present disclosure. The diagram 600 may illustrate aspects of the system 100 and/or 500 described with reference to FIG. 1 or 5, respectively. The diagram 600 includes a source cell 605 and a UE 610. The source cell 605 may be an example of one or more of the base stations 105 and/or devices 105 described above with respect to FIGS. 1, 2, 3, 4, and/or 5. The UE 610 may be an example of one or more of the UEs 115 described above with respect to FIG. 1. Generally, the diagram 600 illustrates aspects of implementing dynamic directional synchronization signaling in millimeter wave communication systems. In some examples, a system device, such as one of the UEs 115 and/or base stations 105 may execute one or more sets of codes to control the functional elements of the device to perform some or all of the functions described below.

At block 615, the source cell 605 determines the narrowband signal component and the wideband signal component of the synchronization signal for millimeter wave communications. The signal components may include or convey system timing information, frame timing information, identification information, etc., for the source cell 605. At block 620, the source cell may determine or otherwise identify network characteristics for the millimeter wave communication network. The network characteristics may include channel condition information, interference information, timing synchronization level information, density information, coverage area information, etc. In some aspects, the source cell 605 may determine the network characteristics information per signal component, e.g., network characteristics for the narrowband signal component and network characteristics for the wideband signal component. Accordingly, the source cell 605 may determine the necessity, performance level, etc., for each of the signal components.

At block 625, the source cell 605 may adjust the narrowband signal component parameter(s) and/or the wideband signal component parameter(s). The source cell may adjust the parameters based on the identified network characteristics. For example, the source cell 605 may adjust the transmit power split between the narrowband signal and the wideband signal. If the network characteristics indicate a reduction in the detection of the narrowband signal for UEs at an edge of the coverage area of the source cell 605, the transmission power of the narrowband may be increased. In a fixed or limited transmission power environment, the transmission power of the accompanying wideband signal may be proportionally reduced.

As another example, when the network characteristics indicate that at least a certain level of timing synchronization is present among UEs (e.g., UEs that recently communicated with a different base station), the source cell 605 may adjust the transmission power and/or bandwidth of the narrowband signal and/or the wideband signal. The source cell 605 may also increase the bandwidth of the wideband signal when the network characteristics indicate that the wideband signal is being used for channel estimation by a UE, that pathloss is greater than a preset amount, that a level of frequency selectivity exceeds a known value, or combinations thereof. In some examples, the source cell 605 may transmit the wideband signal on consecutive tones (or frequencies), on alternating tones, on non-uniform tones, or some other tone distribution scheme based on the identified network characteristics. Accordingly, the source cell 605 may determine and adjust the narrowband signal and the wideband signal components of the synchronization signal based on the network characteristics of the millimeter wave communication network.

In some examples, the narrowband signal component may be a beacon. The wideband signal component may be a wideband signal and, in some cases, include a root value for a Zadoff-Chu sequence, or other information relating to a Zadoff-Chu sequence, a pseudorandom noise (PR) sequence, or a maximum length sequence (m-sequence). At block 630, the source cell 605 may send the narrowband signal component and the wideband signal component of the synchronization signal with the adjusted parameters.

FIGS. 7A-7E are diagrams 700-*a*-700-*e*, respectively, illustrating aspects of an example dynamic synchronization signal, in accordance with various aspects of the present disclosure. The diagrams 700 may illustrate aspects of the system 100 and/or 500 described with reference to FIG. 1 or 5, respectively. One or more of the base stations 105 and/or devices 105 described above with respect to FIGS. 1, 2, 3, 4, and/or 5 may implement aspects of the diagrams 700. In some examples, a system device, such as one of the UEs 115 and/or base stations 105 may execute one or more sets of codes to control the functional elements of the device to perform some or all of the functions illustrated with respect to diagram 700.

Figure 7A:
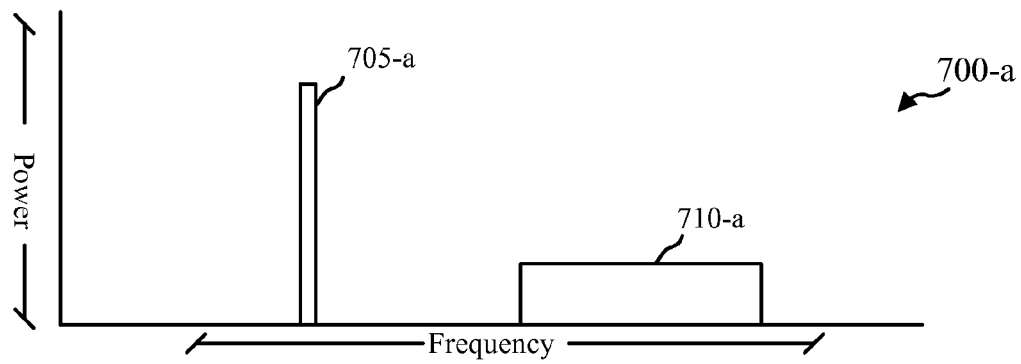
FIGS. 7A-7E show diagrams of an example dual-component synchronization signals, in accordance with various aspects of the present disclosure.

The diagrams 700 may include a narrowband signal 705 and a wideband signal 710 of a synchronization signal for millimeter wave communications. The narrowband signal 705 may generally have an amplitude greater than the wideband signal. In accordance with aspects of the present disclosure, one or more parameters of the narrowband signal 705 and/or the wideband signal 710 may be adjusted based on identified network characteristics of the millimeter wave communication network. As shown in FIG. 7A, the source cell may determine the narrowband signal 705-*a* and the wideband signal 710-*a* to have a predefined transmission power level/ratio and also to have a predefined bandwidth. If the network characteristics indicate that the predefined transmission power levels/ratio and/or bandwidths are sufficient given the current network conditions, the source cell may transmit the narrowband signal 705-*a* and the wideband signal 710-*a* at the predefined levels.

Figure 7B:
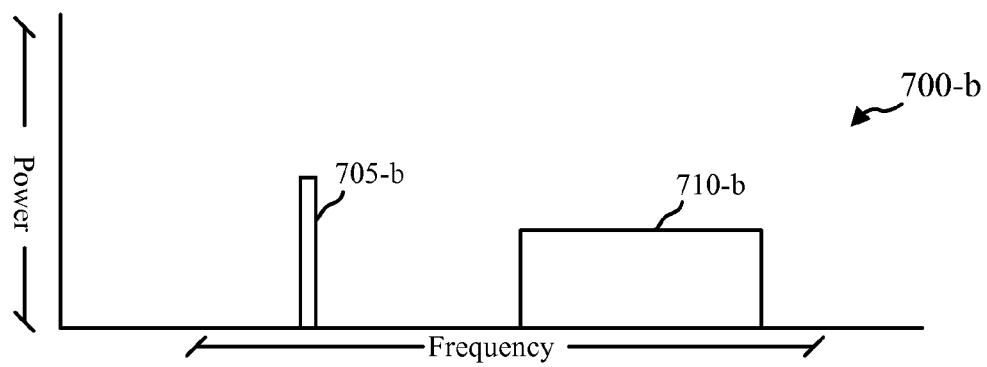
Figure 7C:
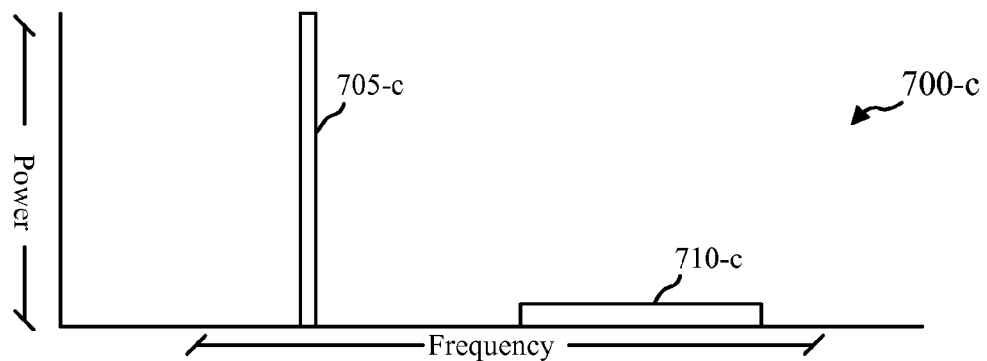

As shown in FIG. 7B, however, the source cell may adjust the transmission power levels/ratio when the network characteristics suggest such dynamic adjustments would be prudent. In the example shown in FIG. 7B, the source cell may reduce the transmit power of the narrowband signal 705-*b* and increase the transmission power of the wideband signal 710-*b*. In contrast, the source cell may, based on the network characteristics, increase the transmission power of the narrowband signal 705-*c* while reducing the transmission power of the wideband signal 710-*c*, as shown in FIG. 7C.

Figure 7D:
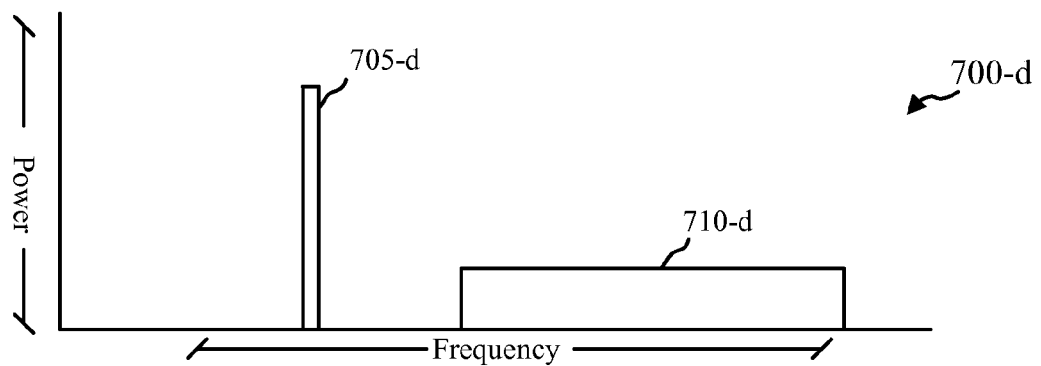
Figure 7E:
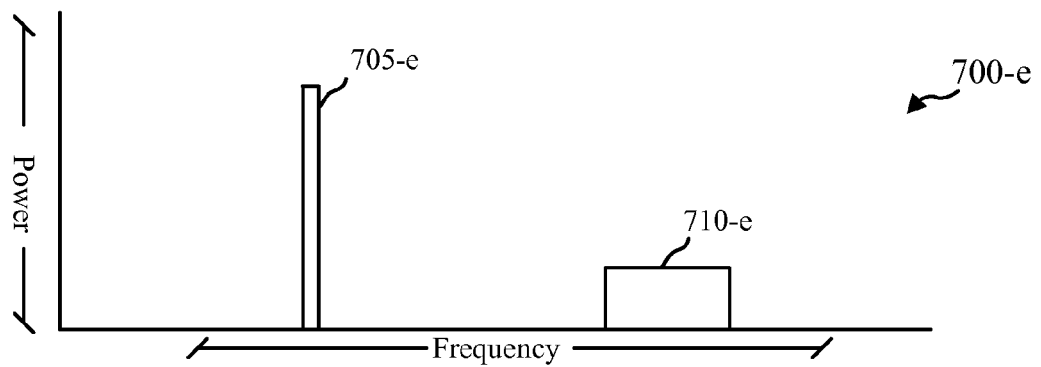

In other examples, the source cell may, based on the network characteristics, change the bandwidth of the narrowband signal 705 and/or the wideband signal 710. As shown in FIG. 7D, the source cell may increase the bandwidth of the wideband signal 710-*d* when the network characteristics suggest such dynamic adjustment would be prudent. To the contrary, the source cell may reduce the bandwidth of the wideband signal 710-*e* when the network characteristics suggest such adjustment, as shown in FIG. 7E.

Although FIGS. 7A-7E show examples of dynamic adjustments to the narrowband signal 705 and/or the wideband signal 710, it can be appreciated that other adjustments may be provided, dependent upon the conditions of the millimeter wave communication network. For example, in some network environments, the narrowband signal 705 and/or the wideband signal 710 may be determined to be unnecessary and, therefore, eliminated from the synchronization signal.

Figure 8:
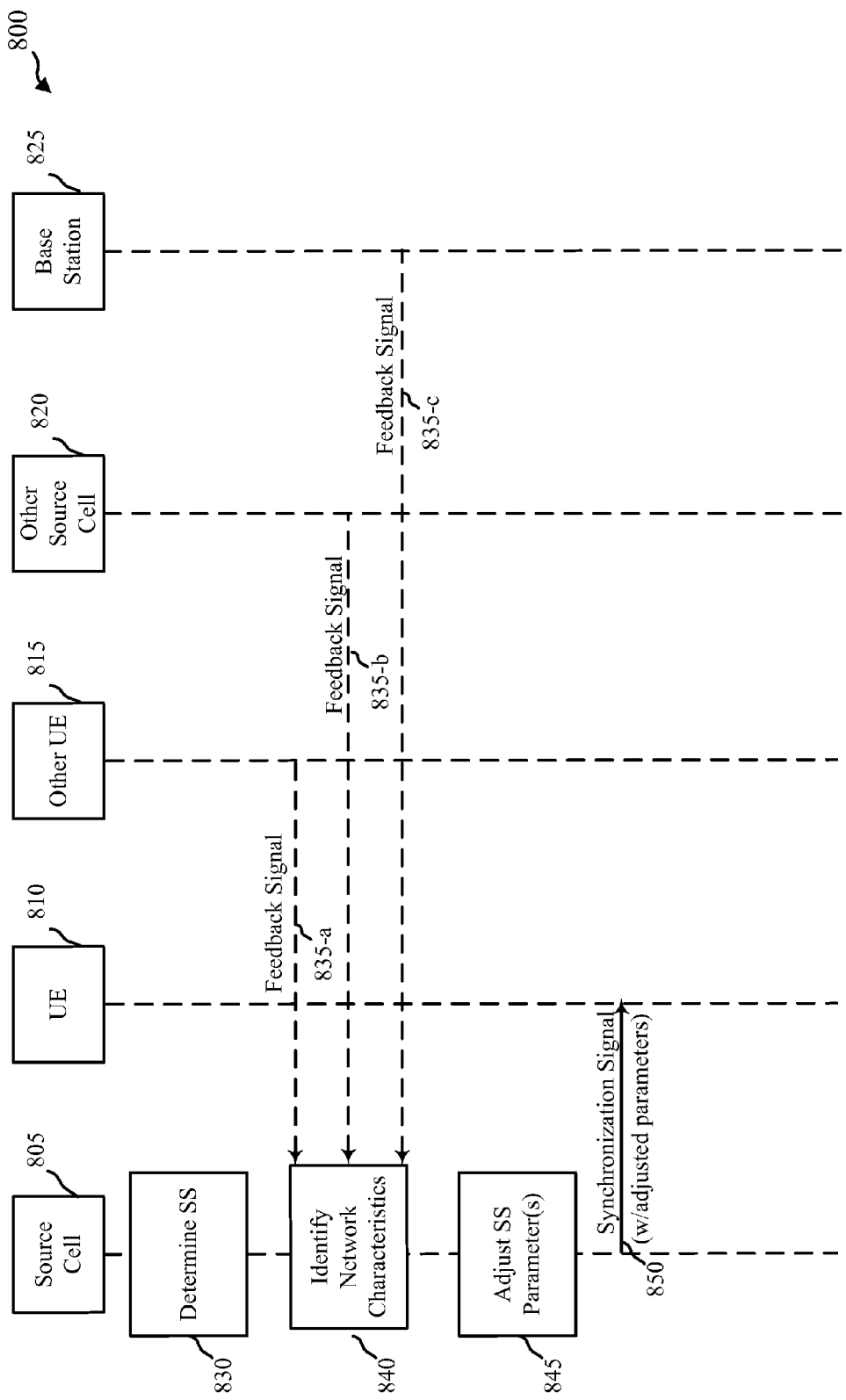
FIG. 8 shows a swim diagram illustrative aspects of dynamic direction synchronization signals in wireless communication, in accordance with various aspects of the present disclosure.

FIG. 8 is a swim diagram 800 illustrating aspects of synchronization operations, in accordance with various aspects of the present disclosure. The diagram 800 may illustrate aspects of the system 100 and/or 500 described with reference to FIG. 1 or 5, respectively. The diagram 800 includes a source cell 805, a UE 810, an additional UE 815, an additional source cell 820, and a base station 825. The source cell 805 and/or the other source cell 820 may be examples of one or more of the base stations 105 and/or devices 105 described above with respect to FIGS. 1, 2, 3, 4, and/or 5. The UE 810 and/or the other UE 815 may be an example of one or more of the UEs 115 described above with respect to FIG. 1. The base station 825 may be an example of a non-millimeter wave base station, e.g., an LTE/LTE-A base station. Generally, the diagram 800 illustrates aspects of implementing dynamic directional synchronization signaling in millimeter wave communication systems. In some examples, a system device, such as one of the UEs 115 and/or base stations 105 may execute one or more sets of codes to control the functional elements of the device to perform some or all of the functions described below.

At block 830, the source cell 805 determines the narrowband signal component and the wideband signal component of the synchronization signal for millimeter wave communications. The signal components may include or convey system timing information, frame timing information, identification information, etc., for the source cell 605. At block 840, the source cell may determine or otherwise identify network characteristics for the millimeter wave communication network. The network characteristics may include channel condition information, interference information, timing synchronization level information, density information, coverage area information, etc. In some aspects, the source cell 605 may determine the network characteristics information per signal component, e.g., network characteristics for the narrowband signal component and network characteristics for the wideband signal component. Accordingly, the source cell 605 may determine the necessity, performance level, etc., for each of the signal components.

In some examples, the source cell 805 may determine the network characteristics based, at least in part, on feedback signals 835. For example, the source cell 805 may receive feedback signal 835-*a* from other UE(s) 815 of the millimeter wave communication network. The other UEs 815 may include UEs that are communicating with the source cell 805 via millimeter wave communications. The other UEs 815 may be providing their respective location information to the source cell 805, channel condition information, interference level information, timing synchronization levels, etc. Additionally or alternatively, the source cell 805 may be receiving feedback signal 835-*b* from another source cell(s) 820. The other source cell may be a cell or base station of the millimeter wave communication network and may convey its own channel condition information, for example, and/or relay such feedback signals from other UEs. Additionally or alternatively, the source cell 805 may be receiving feedback signal 835-*c* from a base station 825. The base station 825 may be a non-millimeter wave base station and may send the feedback signal via a backhaul communication link. In some examples, the base station 825 may relay feedback signal 835-*c* from UEs it communicates with, but who are also located in the coverage area of the source cell 805. Accordingly, the source cell 805 may determine a wide variety of network characteristics to ensure optimal parameter adjustment of the narrowband signal and/or the wideband signal.

At block 845, the source cell 805 may adjust the narrowband signal component parameter(s) and/or the wideband signal component parameter(s). The source cell may adjust the parameters based on the identified network characteristics. For example, the source cell 805 may adjust the transmit power split between the narrowband signal and the wideband signal. At block 850, the source cell 805 may send the narrowband signal component and the wideband signal component of the synchronization signal with the adjusted parameters.

Figure 9:
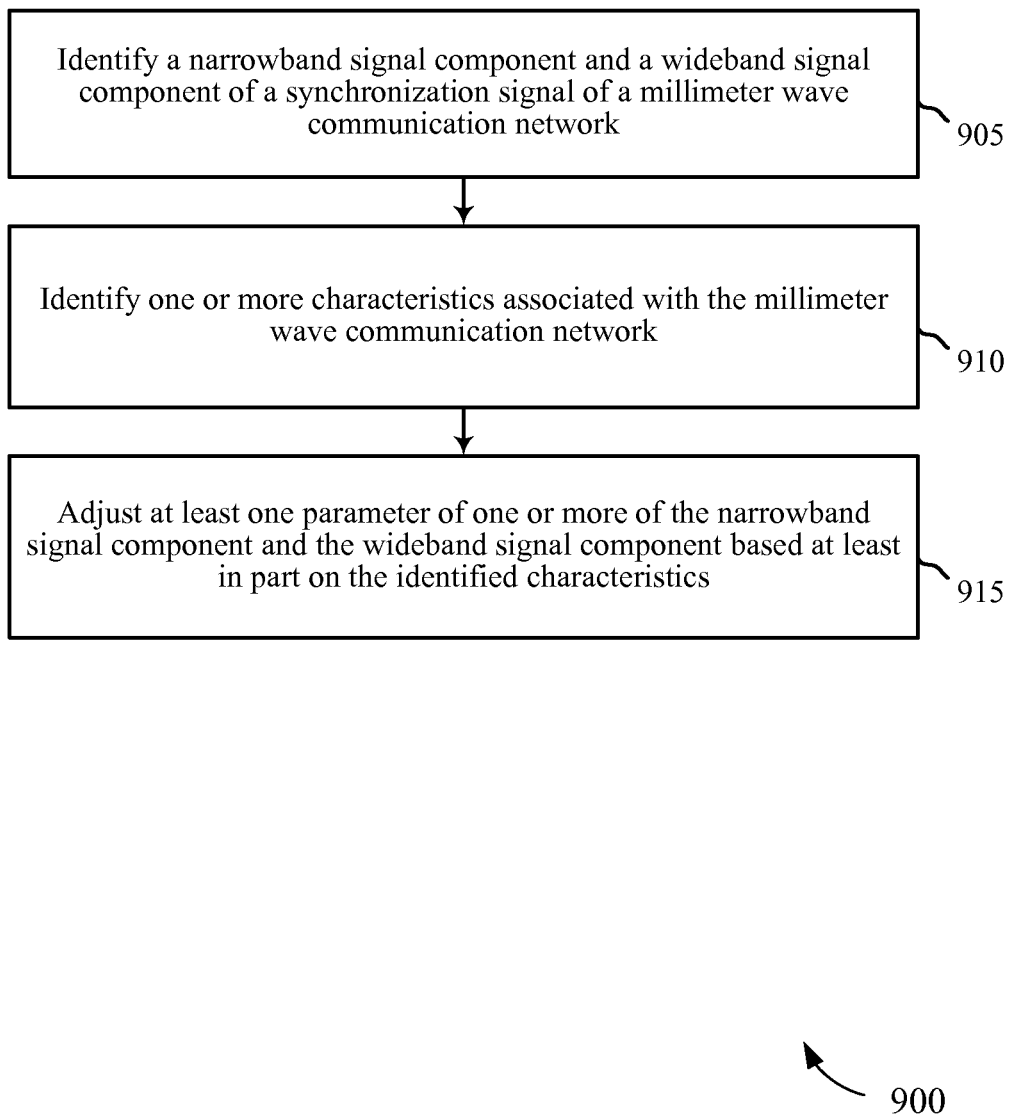
FIG. 9 is a flow chart illustrating an example of a method for wireless communication, in accordance with various aspects of the present disclosure.

FIG. 9 is a flow chart illustrating an example of a method 900 for wireless communication, in accordance with various aspects of the present disclosure. For clarity, the method 900 is described below with reference to aspects of one or more of the base stations described with reference to FIG. 1, 6, 7, or 8, and/or aspects of one or more of the devices described with reference to FIG. 2, 3, 4, or 5. In some examples, a base station may execute one or more sets of codes to control the functional elements of the base station to perform the functions described below. Additionally or alternatively, the base station may perform one or more of the functions described below using special-purpose hardware.

At block 905, the method 900 may include the base station identifying a narrowband signal component and a wideband signal component of a synchronization signal for millimeter wave communications. The narrowband signal and the wideband signal may include or otherwise convey timing information, identification information for the base station, etc. At block 910, the base station may identify one or more characteristics associated with the millimeter wave communication network. Network characteristics may include, for example, pathloss conditions, interference levels, timing synchronization levels, etc. The base station may determine the network characteristics based on internal information (e.g., internal measurements, monitoring status, etc.) and/or based on feedback signals received from other components. At block 915, the base station may adjust at least one parameter of the narrowband signal component or the wideband signal component based on the network characteristics. For example, the base station may adjust a transmission power level or ratio, adjust a bandwidth, adjust a tone selection, etc.

The operation(s) at blocks 905, 910, and 915 may be performed using the synchronization management module 210 and/or the synchronization signal determination module 510 described with reference to FIG. 2, 3, 4, or 5.

Thus, the method 900 may provide for wireless communication. It should be noted that the method 900 is just one implementation and that the operations of the method 900 may be rearranged or otherwise modified such that other implementations are possible.

Figure 10:
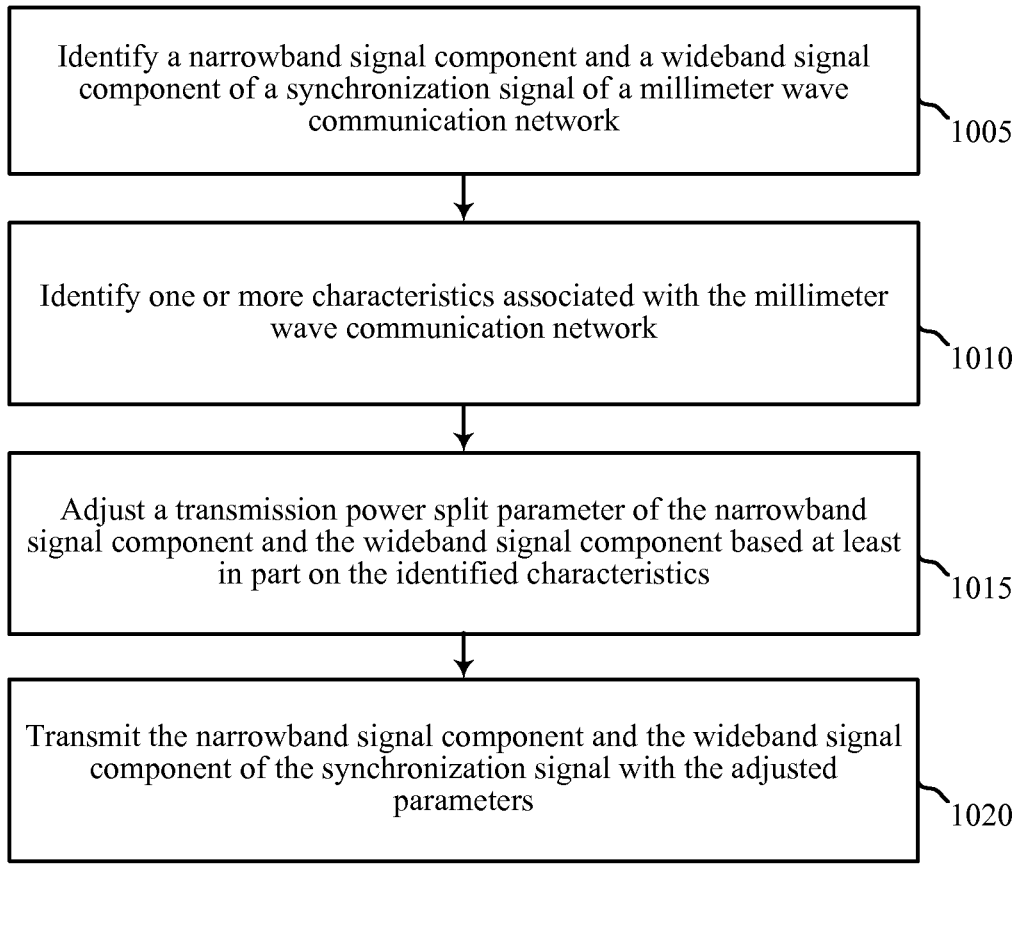
FIG. 10 is a flow chart illustrating an example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of one or more of the base stations described with reference to FIG. 1, 6, 7, or 8, and/or aspects of one or more of the devices described with reference to FIG. 2, 3, 4, or 5. In some examples, a base station may execute one or more sets of codes to control the functional elements of the base station to perform the functions described below. Additionally or alternatively, the base station may perform one or more of the functions described below using special-purpose hardware.

At block 1005, the method 1000 may include the base station identifying a narrowband signal component and a wideband signal component of a synchronization signal for millimeter wave communications. The narrowband signal and the wideband signal may include or otherwise convey timing information, identification information for the base station, etc. At block 1010, the base station may identify one or more characteristics associated with the millimeter wave communication network. Network characteristics may include, for example, pathloss conditions, interference levels, timing synchronization levels, etc. The base station may determine the network characteristics based on internal information (e.g., internal measurements, monitoring status, etc.) and/or based on feedback signals received from other components. At block 1015, the base station may adjust a transmission power split parameter of the narrowband signal component or the wideband signal component based on the identified network characteristics. For example, the base station may increase the transmission power of the narrowband signal component and decrease the transmission power of the wideband signal component, or vice versa.

At block 1020, the base station may transmit the narrowband signal component and the wideband signal component of the synchronization signal with the adjusted parameters. In some examples, the base station may transmit the signal components directionally via beamformed signals.

The operation(s) at blocks 1005, 1010, 1015, and 1020 may be performed using the synchronization management module 210 and/or the synchronization signal determination module 510 described with reference to FIG. 2, 3, 4, or 5.

Thus, the method 1000 may provide for wireless communication. It should be noted that the method 1000 is just one implementation and that the operations of the method 1000 may be rearranged or otherwise modified such that other implementations are possible.

Figure 11:
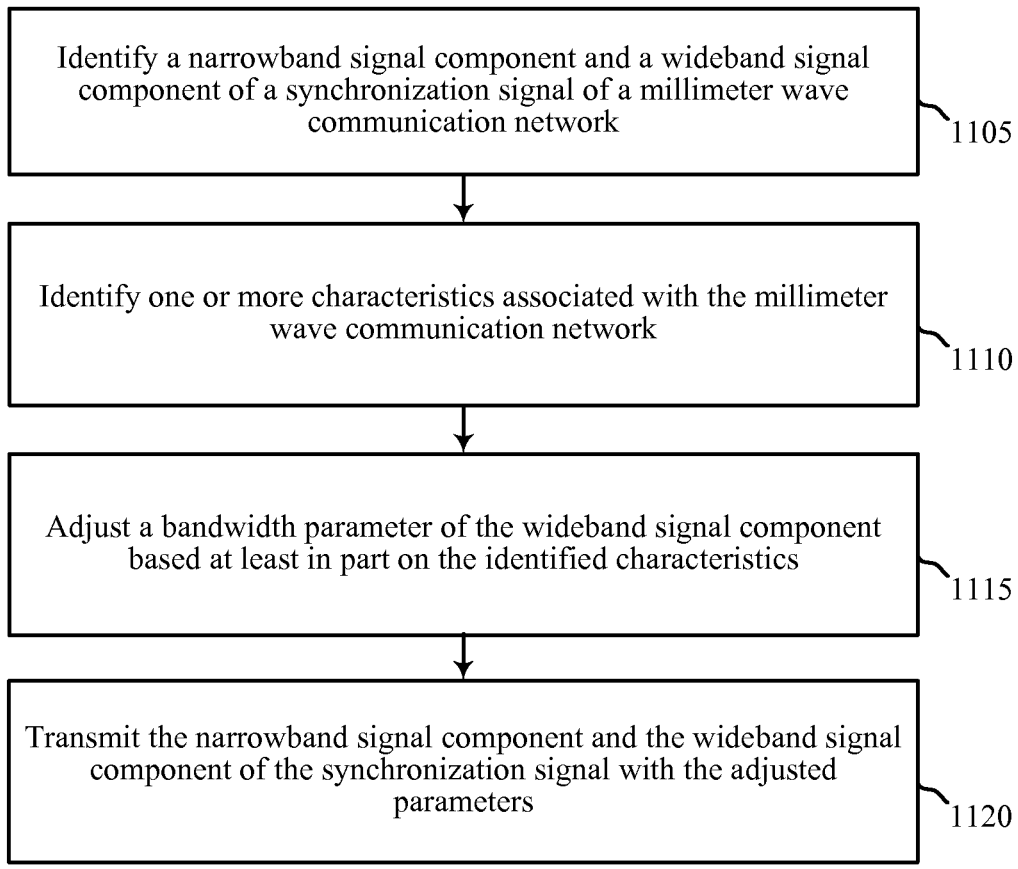
FIG. 11 is a flow chart illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of one or more of the base stations described with reference to FIG. 1, 6, 7, or 8, and/or aspects of one or more of the devices described with reference to FIG. 2, 3, 4, or 5. In some examples, a base station may execute one or more sets of codes to control the functional elements of the base station to perform the functions described below. Additionally or alternatively, the base station may perform one or more of the functions described below using special-purpose hardware.

At block 1105, the method 1100 may include the base station identifying a narrowband signal component and a wideband signal component of a synchronization signal for millimeter wave communications. The narrowband signal and the wideband signal may include or otherwise convey timing information, identification information for the base station, etc. At block 1010, the base station may identify one or more characteristics associated with the millimeter wave communication network. Network characteristics may include, for example, pathloss conditions, interference levels, timing synchronization levels, etc. The base station may determine the network characteristics based on internal information (e.g., internal measurements, monitoring status, etc.) and/or based on feedback signals received from other components. At block 1015, the base station may adjust a bandwidth parameter of the wideband signal component based on the identified network characteristics. For example, the base station may increase or decrease the bandwidth of the wideband signal component.

At block 1120, the base station may transmit the narrowband signal component and the wideband signal component of the synchronization signal with the adjusted parameters. In some examples, the base station may transmit the signal components directionally via beamformed signals.

The operation(s) at blocks 1105, 1110, 1115, and 1120 may be performed using the synchronization management module 210 and/or the synchronization signal determination module 510 described with reference to FIG. 2, 3, 4, or 5.

Thus, the method 1100 may provide for wireless communication. It should be noted that the method 1100 is just one implementation and that the operations of the method 1100 may be rearranged or otherwise modified such that other implementations are possible.

In some examples, aspects from two or more of the methods 900, 1000, and/or 1100 may be combined. It should be noted that the methods 900, 1000, and 1100 are just example implementations, and that the operations of the methods 900-1100 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communications, comprising:
   determining a narrowband signal component and a wideband signal component of a synchronization signal of a millimeter wave communication network;
   identifying one or more characteristics associated with the millimeter wave communication network, wherein the one or more characteristics comprises one or more of a level of timing synchronization between one or more user equipments (UEs) located within a coverage area of a source transmitting the narrowband signal component and the wideband signal component, a false alarm rate associated with the one or more UEs detecting an incorrect synchronization signal, a distribution of UEs entering the coverage area of the source, or a combination thereof; and
   adjusting a transmission power split between the narrowband signal component and the wideband signal component based at least in part on the one or more characteristics.

2. The method of claim 1, wherein the transmission power split comprises a ratio of a first transmission power of the narrowband signal component and a second transmission power of the wideband signal component.

3. The method of claim 1, further comprising:
   identifying a reduction in a detection of the narrowband signal component by one or more UEs located at an edge of a coverage area of a source transmitting the narrowband signal component and the wideband signal component; and wherein adjusting the transmission power split comprises:
     increasing a first transmission power of the narrowband signal component based at least in part on the reduction; and
     decreasing a second transmission power of the wideband signal component based at least in part on the reduction.

4. The method of claim 1, further comprising:
   receiving information indicative of a level of timing synchronization between one or more UEs located within a coverage area of a source transmitting the narrowband signal component and the wideband signal component; and
   adjusting a parameter of at least one of the narrowband signal component or the wideband signal component based at least in part on the level of timing synchronization.

5. The method of claim 1, further comprising:
   adjusting a bandwidth of the wideband signal component.

6. The method of claim 5, further comprising:
   increasing the bandwidth of the wideband signal component based at least in part on a determination of a pathloss above a predefined threshold or a level of frequency selectivity exceeding a predefined value.

7. The method of claim 5, further comprising:
   increasing the bandwidth of the wideband signal component based at least in part on a determination that the wideband signal component is being used for channel estimation by at least one user equipment.

8. The method of claim 1, further comprising:
   transmitting the wideband signal component on at least one of consecutive tones, alternating tones, or non-uniform tones.

9. The method of claim 1, wherein identifying the one or more characteristics comprises one or more of:
   receiving a feedback signal from one or more UEs communicating via the millimeter wave communication network, receiving a feedback signal from one or more other sources of the millimeter wave communication network, receiving a feedback signal from one or more base stations of a non-millimeter wave communication network, or a combination thereof.

10. The method of claim 1, wherein the narrowband signal component comprises a beacon signal and the wideband signal component comprises a wideband signal.

11. The method of claim 10, wherein the wideband signal comprises a Zadoff-Chu sequence.

12. The method of claim 1, wherein the narrowband signal component and the wideband signal component of the synchronization signal are directionally transmitted via one or more beamformed signals.

13. An apparatus for wireless communications, comprising:
   a processor;
   memory coupled to the processor, wherein the processor is configured to:
     determine a narrowband signal component and a wideband signal component of a synchronization signal of a millimeter wave communication network;
     identify one or more characteristics associated with the millimeter wave communication network, wherein the one or more characteristics comprises one or more of a level of timing synchronization between one or more user equipments (UEs) located within a coverage area of a source transmitting the narrowband signal component and the wideband signal component, a false alarm rate associated with the one or more UEs detecting an incorrect synchronization signal, a distribution of UEs entering the coverage area of the source, or a combination thereof; and
     adjust a transmission power split between the narrowband signal component and the wideband signal component based at least in part on the one or more characteristics.

14. The apparatus of claim 13, wherein the transmission power split comprises a ratio of a first transmission power of the narrowband signal component and a second transmission power of the wideband signal component.

15. The apparatus of claim 13, wherein the processor is further configured to:

identify a reduction in a detection of the narrowband signal component by one or more UEs located at an edge of a coverage area of a source transmitting the narrowband signal component and the wideband signal component; and wherein the processor configured to adjust the transmission power split comprises the processor configured to:
increase a first transmission power of the narrowband signal component based at least in part on the reduction; and
decrease a second transmission power of the wideband signal component based at least in part on the reduction.

16. The apparatus of claim 13, wherein the processor is further configured to:
receive information indicative of predefined level of timing synchronization between one or more UEs located within a coverage area of a source transmitting the narrowband signal component and the wideband signal component; and
adjust a parameter of at least one of the narrowband signal component or the wideband signal component based at least in part on the level of timing synchronization.

17. The apparatus of claim 13, wherein the processor is further configured to:
adjust a bandwidth of the wideband signal component.

18. The apparatus of claim 17, wherein the processor is further configured to:
increase the bandwidth of the wideband signal component based at least in part on a determination of a pathloss above a predefined threshold or a level of frequency selectivity exceeding a predefined value.

19. The apparatus of claim 17, wherein the processor is further configured to:
increase the bandwidth of the wideband signal component based at least in part on a determination that the wideband signal component is being used for channel estimation by at least one user equipment.

20. A non-transitory computer-readable medium for storing instructions executable by a processor, comprising:
instructions to determine a narrowband signal component and a wideband signal component of a synchronization signal of a millimeter wave communication network;
instructions to identify one or more characteristics associated with the millimeter wave communication network, wherein the one or more characteristics comprises one or more of a level of timing synchronization between one or more user equipments (UEs) located within a coverage area of a source transmitting the narrowband signal component and the wideband signal component, a false alarm rate associated with the one or more UEs detecting an incorrect synchronization signal, a distribution of UEs entering the coverage area of the source, or a combination thereof; and
instructions to adjust a transmission power split between the narrowband signal component and the wideband signal component based at least in part on the one or more characteristics.

21. A method for wireless communications, comprising:
determining a narrowband signal component and a wideband signal component of a synchronization signal of a millimeter wave communication network;
identifying one or more characteristics associated with the millimeter wave communication network;
determining network information based at least in part on the one or more characteristics, the network information comprising one of an indication that a pathloss exceeds a predefined threshold, an indication that a level of frequency selectivity exceeds a predefined value, or an indication that the wideband signal component is being used for channel estimation by at least one user equipment; and
increasing a bandwidth of the wideband signal component based at least in part on the network information.

22. The method of claim 21, further comprising:
adjusting a transmission power split between the narrowband signal component and the wideband signal component.

23. The method of claim 22, wherein the transmission power split comprises a ratio of a first transmission power of the narrowband signal component and a second transmission power of the wideband signal component.

24. The method of claim 21, further comprising:
identifying a reduction in a detection of the narrowband signal component by one or more user equipments located at an edge of a coverage area of a source transmitting the narrowband signal component and the wideband signal component;
increasing a first transmission power of the narrowband signal component based at least in part on the reduction; and
decreasing a second transmission power of the wideband signal component based at least in part on the reduction.

25. The method of claim 21, wherein the one or more characteristics comprises one or more of a level of timing synchronization between one or more user equipments (UEs) located within a coverage area of a source transmitting the narrowband signal component and the wideband signal component, a false alarm rate associated with the one or more UEs detecting an incorrect synchronization signal, a distribution of UEs entering the coverage area of the source, or a combination thereof.

26. An apparatus for wireless communications, comprising:
a processor;
memory coupled to the processor, wherein the processor is configured to:
determine a narrowband signal component and a wideband signal component of a synchronization signal of a millimeter wave communication network;
identify one or more characteristics associated with the millimeter wave communication network;
determine network information based at least in part on the one or more characteristics, the network information comprising one of an indication that a pathloss exceeds a predefined threshold, an indication that a level of frequency selectivity exceeds a predefined value, or an indication that the wideband signal component is being used for channel estimation by at least one user equipment; and
increase a bandwidth of the wideband signal component based at least in part on the network information.

27. The apparatus of claim 26, wherein the processor is further configured to:
adjust a transmission power split between the narrowband signal component and the wideband signal component.

28. The apparatus of claim 27, wherein the transmission power split comprises a ratio of a first transmission power of the narrowband signal component and a second transmission power of the wideband signal component.

29. The apparatus of claim 26, wherein the processor is further configured to:

identify a reduction in a detection of the narrowband signal component by one or more user equipments located at an edge of a coverage area of a source transmitting the narrowband signal component and the wideband signal component;

increase a first transmission power of the narrowband signal component based at least in part on the identified reduction; and decrease a second transmission power of the wideband signal component based at least in part on the identified reduction.

30. The apparatus of claim 26, wherein the one or more characteristics comprises one or more of a level of timing synchronization between one or more user equipments (UEs) located within a coverage area of a source transmitting the narrowband signal component and the wideband signal component, a false alarm rate associated with the one or more UEs detecting an incorrect synchronization signal, a distribution of UEs entering the coverage area of the source, or a combination thereof.

* * * * *